Sept. 29, 1970     W. L. KING     3,531,672
STATOR WINDING HAVING MAXIMUM OF TWO ADJACENT END TURNS
Filed Dec. 10, 1968
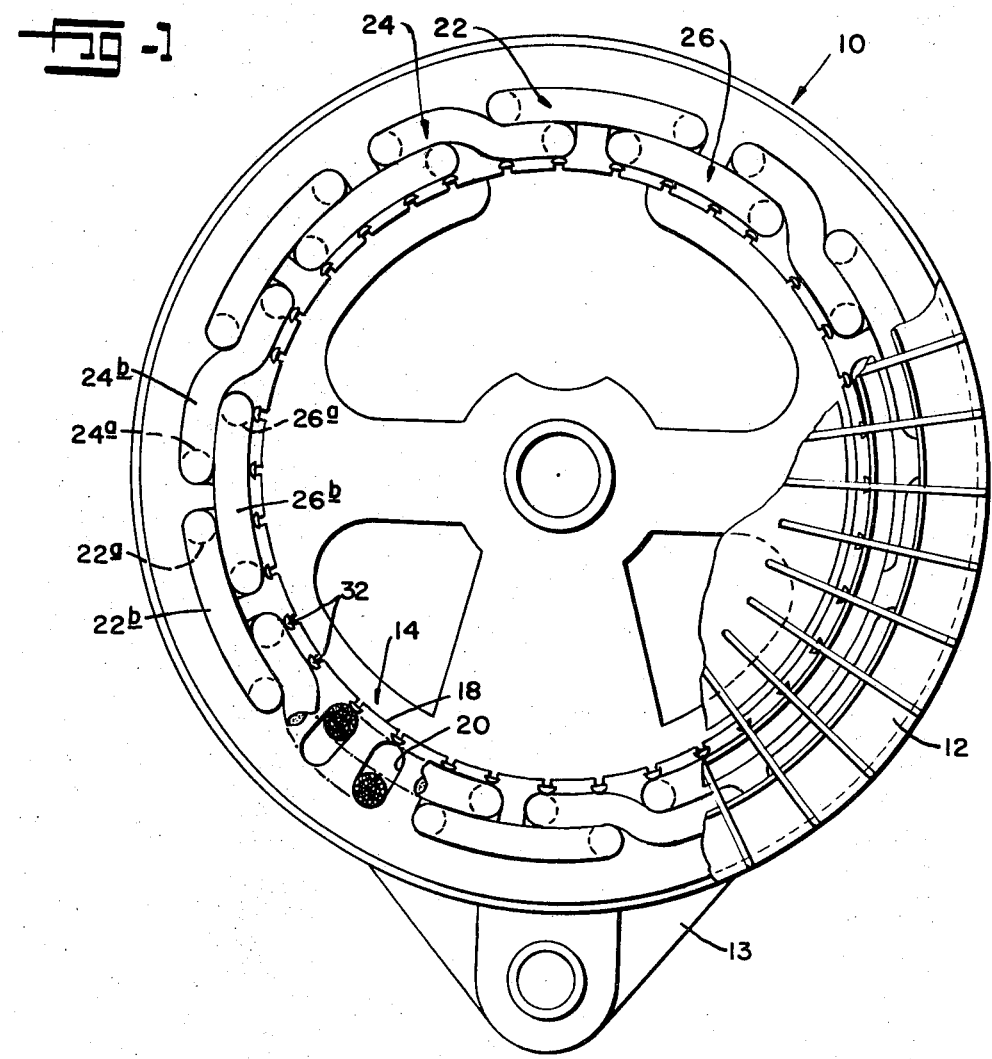
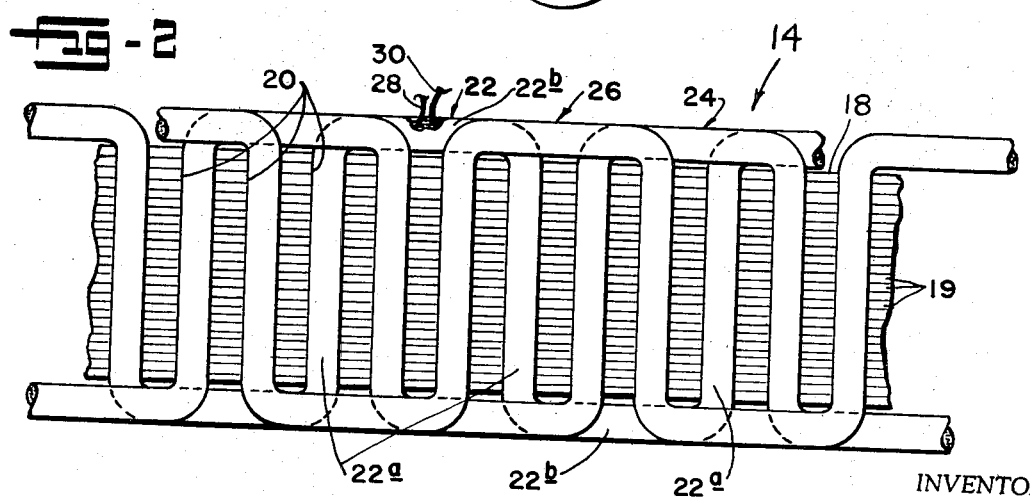
INVENTOR.
William L. King
BY
KOLISCH and HARTWELL
ATTORNEYS

United States Patent Office 3,531,672
Patented Sept. 29, 1970

3,531,672
STATOR WINDING HAVING MAXIMUM OF TWO ADJACENT END TURNS
William L. King, Springfield, Oreg., assignor to Nathan E. Knecht, Springfield, Oreg.
Filed Dec. 10, 1968, Ser. No. 782,675
Int. Cl. H02k 3/00
U.S. Cl. 310—180                4 Claims

ABSTRACT OF THE DISCLOSURE

A dynamoelectric machine including a stator ring having plural substantially parallel axially extending slots distributed circumferentially of the ring. Mounted on the stator ring are three windings each including a series of axially extending runs disposed in every third slot in the ring, and a series of circumferentially extending reaches joining with ends of the runs and producing a wave pattern for the winding. The runs of a winding occupy slots different from the slots occupied by the runs of the other windings. The windings are positioned relative to one another whereby at each axial end of the stator ring no more than two reaches extend past one another at any point.

---

This invention pertains to a dynamoelectric machine, and more particularly, to a stator assembly for such a machine.

A typical dynamoelectric machine, such as a motor or generator, includes a stator assembly comprising generally an iron ring with wire windings mounted on the ring. In many such machines, it is important that the stator assembly contain a relatively large amount of wire, yet be relatively small. These two objectives, however, tend to work against one another, and have heretofore been difficult to attain in a machine.

A particular problem in the past, resulting from the above-mentioned dilemma, has been the difficulty of producing for a three-phase macine a satisfactory stator assembly having a minimal axial dimension. Known constructions have been characterized by a considerable amount of overlapping of windings adjacent the axial ends of a stator ring. With large amounts of wire used in windings, extensive overlapping greatly increases the total axial dimension of an assembly. Such overlapping has resulted from the manner in which windings have been mounted on rings.

A general object of the present invention, therefore, is to provide, for a three-phase dynamoelectric machine, a novel stator assembly which takes care of the above-indicated difficulty in a practical and satisfactory manner.

More specifically, an object of the invention is to provide such an assembly wherein a relatively large amount of wire can be utilized in a relatively compact space.

A related object is to provide an assembly including a stator ring, and wherein overlapping of windings adjacent the axial ends of the ring is greatly minimized, thus resulting in an assembly having a minimal axial dimension.

According to a preferred embodiment of the invention, first, second, and third windings (each containing a number of turns of wire) are mounted on a stator ring including a plurality of axially extending substantially parallel slots distributed circumferentially of the ring. Each winding includes a series of axially extending runs disposed in every third slot in the stator ring, and a series of circumferentially extending reaches disposed adjacent axially opposite ends of the ring joining with the runs and producing a wave pattern for the winding. The runs of a winding occupy slots different from the slots occupied by the runs of the other windings. The windings are positioned relative to one another in such a fashion that at each end of the stator ring, no more than two reaches of different windings are juxtapositioned at any given region.

These and other objects and advantages attained by the invention will become more fully apparent as the description which follows is read in conjunction with the accompanying drawings, wherein:

FIG. 1 is a view of one axial end of a dynamoelectric machine including a stator assembly constructed according to the invention, with a portion of a frame section in the machine broken away; and FIG. 2 is a fragmentary developed view further illustrating the stator assembly of FIG. 1, with the assembly removed from the frame of the machine.

Turning now to the drawings, indicated generally at 10 in FIG. 1 is an alternator, or dynamoelectric machine. The alternator comprises a frame, including axially aligned frame sections 12, 13 and a stator assembly 14 constructed according to the invention mounted on the frame. The rotor in the alternator, which conventionally rotates within the stator, has been omitted in order to simplify the drawings.

The stator assembly comprises an annular stator ring 18 formed in a conventional fashion from an axial stack of soft iron stampings, such as stampings 19. Ring 18 includes a plurality of axially extending spaced-apart slots 20. Slots 20 are disposed in side-by-side substantially parallel relation, and are distributed circumferentially about the inner circumferential margin of the ring. As can be seen in the developed view of assembly 14 in FIG. 2, each slot extends between and opens onto axially opposite ends of ring 18.

Mounted on the stator ring are three continuous wave windings, indicated at 22, 24, 26. Each winding preferably is formed from an elongated single conductor, such as a strand of insulated solid copper wire, which extends in multiple passes over the course of the winding whereby the winding at any given region therealong appears as a bundle of conductors. In the drawings, for reasons of simplicity and to make the drawings clearer, the overall outline only of a winding is shown, with no attempts made to indicate the passes of a conductor in the winding. The opposite ends of the conductor forming each winding extend out from the winding at any suitable location, to permit electrical connections to be made therewith. Exemplary of such ends are the ends of the conductor forming winding 22, illustrated at 28, 30 in FIG. 2.

Windings 22, 24, 26 are similar in configuration. Considering winding 22, it includes a series of axially extending runs, such as runs 22a, joined by a series of circumferentially extending reaches, such as reaches 22b. The runs of the winding are disposed in every third slot in ring 18, and the reaches extend in planes disposed closely adjacent the opposite axial ends of the ring.

Windings 24, 26 include runs 24a, 26a and reaches 24b, 26b similar to runs 22a and reaches 22b, respectively, of winding 22. The runs of each winding occupy slots in the stator ring which are different from the slots occupied by the runs of the other windings. The reaches of windings 24, 26 extend in substantially the same planes as the planes of the reaches of winding 22.

Plug strips 32 are packed into the various slots, after placement of the windings, to complete the stator assembly.

Further considering winding assembly 14, an important feature of the invention is that the various windings are positioned relative to one another so that, at each axial end of ring 18, no more than two reaches from different windings are juxtapositioned at any point about the end. This is attained by positioning the windings so that where reaches of two different windings are juxtapositioned, such reaches, extending in a common circumferential direction about the stator ring, join with runs disposed in slots separated by a slot containing a run of the other winding. This is illustrated in FIG. 1, where it will be seen that reaches 22b, 26b are juxtapositioned, and extending clockwise in the figure, these join with runs 22a, 26a which are separated by the slot containing run 24a of winding 24.

As a consequence of this type of organization, there need be no crossover of winding reaches at the ends of the stator. As a result, even where a relatively large amount of wire is employed in the windings, relatively small axial dimensions are possible in the final stator assembly.

A further advantage observed in assemblies constructed according to the invention is that they tend to dissipate heat more efficiently than conventional stator assemblies, and thus tend to perform more coolly than the latter.

While a preferred embodiment of the invention has been described herein, it is appreciated that variations and modifications may be made without departing from the spirit of the invention.

It is claimed and desired to secure by Letters Patent:

1. In a three-phase dynamoelectric machine including a stator ring having plural elongated slots disposed in spaced side-by-side substantially parallel relation, each slot extending between and opening onto axially opposite ends of said ring,
    first, second and third elongated continuous wave windings mounted on said stator ring, each including a series of laterally spaced runs extending in an axial direction joined by a series of reaches extending in a circumferential direction, with the reaches and runs producing a wave pattern for the winding that progresses in a circumferential direction about the stator ring,
    the runs of each winding occupying every third slot in the stator ring with such slots being different from the slots occupied by the runs of the other windings,
    said reaches of said windings at each end of the stator ring being distributed with an upper limit of two reaches of different windings juxtapositioned at all regions distributed circumferentially about the ring.

2. The machine of claim 1, wherein considering any two juxtapositioned reaches of any two windings, and progressing along such reaches in a common circumferential direction, the reaches join with runs which occupy slots separated by a slot containing a run of the other winding.

3. The machine of claim 1, wherein the reaches adjacent each axial end of the stator ring occupy a substantially common plane spaced closely adjacent the end.

4. In a three-phase dynamoelectric machine including a stator ring having plural elongated slots disposed in spaced side-by-side substantially parallel relation, each slot extending between and opening onto axially opposite ends of said ring,
    first, second and third elongated continuous wave windings mounted on said stator ring, each including a series of laterally spaced runs extending in an axial direction joined by a series of reaches extending in a circumferential direction, with the reaches and runs producing a wave pattern for the winding that progresses in a circumferential direction about the stator ring,
    the runs of each winding occupying every third slot in the stator ring, with the slots occupied by the runs of a winding being different from the slots occupied by the runs of the other windings,
    said reaches of said windings at each end of the stator ring being distributed with an upper limit of two reaches of different windings extending alongside one another at all regions distributed circumferentially about the ring.

References Cited

UNITED STATES PATENTS

| | | | |
|---|---|---|---|
| 744,145 | 11/1903 | Wiard | 310—184 |
| 771,293 | 10/1904 | Averrett | 310—198 |
| 1,776,767 | 9/1930 | Krause | 310—180 |
| 2,989,654 | 6/1961 | Neyhouse | 310—203 |
| 3,230,434 | 1/1966 | Bauerlein | 310—207 |
| 3,391,294 | 7/1968 | Moxie | 310—214 |
| 3,437,858 | 4/1969 | White | 310—214 |

WARREN E. RAY, Primary Examiner

R. SKUDY, Assistant Examiner

U.S. Cl. X.R.
310—202, 207